(12) United States Patent
Tzomik et al.

(10) Patent No.: US 11,442,393 B2
(45) Date of Patent: Sep. 13, 2022

(54) HEAT TRANSFER PRINTING

(71) Applicant: Hewlett-Packard Development Company, L.P., Spring, TX (US)

(72) Inventors: Inna Tzomik, Nes Ziona (IL); Dima Libster, Nes Ziona (IL); Katty Noorany, Nes Ziona (IL); Albert Teishev, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 17/049,624

(22) PCT Filed: Oct. 3, 2018

(86) PCT No.: PCT/US2018/054264
§ 371 (c)(1),
(2) Date: Oct. 22, 2020

(87) PCT Pub. No.: WO2020/072054
PCT Pub. Date: Apr. 9, 2020

(65) Prior Publication Data
US 2021/0240123 A1    Aug. 5, 2021

(51) Int. Cl.
*G03G 15/00* (2006.01)
*B32B 7/06* (2019.01)
(Continued)

(52) U.S. Cl.
CPC ........... *G03G 15/6591* (2013.01); *B32B 7/06* (2013.01); *B32B 27/12* (2013.01); *B32B 27/40* (2013.01);
(Continued)

(58) Field of Classification Search
CPC ........... G03G 15/6591; G03G 15/1625; G03G 15/10; G03G 17/00; G03G 2215/00801;
(Continued)

(56) References Cited

U.S. PATENT DOCUMENTS

| 5,229,188 A | 7/1993 | Takeuchi et al. |
| 5,298,309 A | 3/1994 | Carls et al. |

(Continued)

FOREIGN PATENT DOCUMENTS

| CN | 1204374 | 1/1999 |
| CN | 1461704 | 12/2003 |

(Continued)

OTHER PUBLICATIONS

International Search Report dated Jun. 6, 2019 for PCT/US2018/054264, Applicant Hewlett-Packard Development Company, L.P.

*Primary Examiner* — Joseph S Wong
(74) *Attorney, Agent, or Firm* — Thorpe North & Western LLP

(57) ABSTRACT

Described herein is a process for heat transfer printing, the process comprising: electrostatically printing a transparent release composition onto a transfer material to form a release layer disposed on the transfer material; electrostatically printing an electrostatic ink composition on the release layer to form an image layer disposed on the release layer; contacting a thermoplastic film with the image layer; contacting the thermoplastic film with a target substrate under conditions such that the thermoplastic film adheres to the target substrate and the release layer is softened; and separating the target substrate and the transfer material such that the thermoplastic film, image layer and release layer are transferred to the target substrate. A heat transferrable printed image is also described herein.

19 Claims, 1 Drawing Sheet

(51) Int. Cl.

| | |
|---|---|
| *B32B 27/12* | (2006.01) |
| *B32B 27/40* | (2006.01) |
| *B32B 37/00* | (2006.01) |
| *D06P 5/24* | (2006.01) |
| *G03G 15/16* | (2006.01) |
| *B41J 2/335* | (2006.01) |
| *B41M 5/025* | (2006.01) |
| *G03G 17/00* | (2006.01) |
| *G03G 15/10* | (2006.01) |

(52) U.S. Cl.
CPC ............ *B32B 37/025* (2013.01); *B41J 2/335* (2013.01); *B41M 5/0256* (2013.01); *D06P 5/007* (2013.01); *G03G 15/1625* (2013.01); *G03G 17/00* (2013.01); *G03G 15/10* (2013.01); *G03G 2215/00801* (2013.01)

(58) Field of Classification Search
CPC ........... B32B 7/06; B32B 27/12; B32B 27/40; B32B 37/025; B41J 2/335; B41M 5/0256; D06P 5/007
See application file for complete search history.

(56) References Cited

U.S. PATENT DOCUMENTS

| | | | |
|---|---|---|---|
| 6,369,843 | B1 | 4/2002 | Springett et al. |
| 6,743,741 | B1 | 6/2004 | Araki et al. |
| 7,364,636 | B2 | 4/2008 | Kronzer |
| 7,389,082 | B2 * | 6/2008 | Okamoto ........... G03G 9/08706 430/108.8 |
| 8,350,880 | B2 | 1/2013 | Dinescu et al. |
| 9,308,773 | B2 | 4/2016 | Steelman et al. |
| 10,620,570 | B2 * | 4/2020 | Tzomik ................. B44C 1/1712 |
| 2002/0047889 | A1 | 4/2002 | Springett et al. |
| 2004/0009422 | A1 * | 1/2004 | Reynolds ........... G03G 15/6591 430/125.32 |
| 2005/0196203 | A1 * | 9/2005 | Tsuda ................... G03G 15/205 399/341 |
| 2007/0275319 | A1 | 11/2007 | He et al. |
| 2013/0135417 | A1 | 5/2013 | Suzuki et al. |
| 2016/0009124 | A1 | 1/2016 | Chiao et al. |
| 2017/0090365 | A1 | 3/2017 | Shimazu et al. |

FOREIGN PATENT DOCUMENTS

| | | |
|---|---|---|
| CN | 2716000 | 8/2005 |
| CN | 1733497 | 2/2006 |
| CN | 1827392 | 9/2006 |
| CN | 101579972 | 11/2009 |
| CN | 103454868 | 12/2013 |
| CN | 104403544 | 3/2015 |
| CN | 105479963 | 4/2016 |
| CN | 107236483 | 10/2017 |
| EP | 0078475 | 5/1983 |
| EP | 2808172 | 12/2014 |
| JP | H0724993 | 1/1995 |
| JP | H0797560 | 4/1995 |
| JP | 09146336 | 6/1997 |
| TW | M262362 | 4/2005 |
| WO | 2017067606 | 4/2017 |
| WO | 2017116798 | 7/2017 |
| WO | 2018184670 | 10/2018 |

* cited by examiner

HEAT TRANSFER PRINTING

BACKGROUND

Heat transfer printing (also known as thermal transfer printing) is the process of transferring images from one substrate to another by the application of heat. The image may first be applied to a first substrate, for example, a polymeric film, this image is then brought into contact with a target substrate, e.g. a metallic film, glass or fabric, and heated. The target substrate and the first substrate may then be separated, leaving the image (in reverse) on the target substrate.

DETAILED DESCRIPTION

Figure 1A:
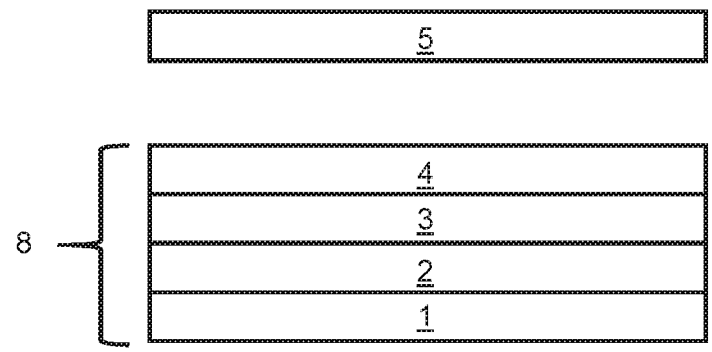
FIGS. 1A, 1B and 1C show, schematically, an example of a process for heat transfer printing as disclosed herein.

Before the heat transfer printing and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic composition or electrophotographic composition. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. The electrostatic ink composition, when printing, may include chargeable particles of the resin and, if present, the pigment dispersed in a liquid carrier, which may be as described herein. The transparent release composition referred to herein may also be described as a transparent electrostatic ink composition, this may be an electrostatic ink composition that lacks a colorant (e.g. a pigment). An electrostatic ink composition for forming an image layer, in contrast, may contain a colorant. A colorant may be a species that imparts a colour to the ink, e.g. a colour selected from a cyan, magenta, yellow and black.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

Softening temperatures/softening points referred to herein may be measured according to standard techniques. For example, the softening point/temperature may be the Vicat softening point/temperature as measured according to ASTM D152, or the Ring and Ball softening point/temperature as determined according to ASTM E28-99.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 1000 V/cm or more, or in some examples 1500 V/cm or more.

As used herein, in the context of the electrostatic ink composition or the release composition, the term "transparent" may mean having no or substantially no colorant or pigment.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not only the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided a process for heat transfer printing. The process may comprise:
- electrostatically printing a transparent release composition onto a transfer material to form a release layer disposed on the transfer material;
- electrostatically printing an electrostatic ink composition on the release layer to form an image layer disposed on the release layer;
- contacting a thermoplastic film with the image layer;
- contacting the thermoplastic film with a target substrate under conditions such that the thermoplastic film adheres to the target substrate and the release layer is softened; and
- separating the target substrate and the transfer material such that the thermoplastic film, image layer and release layer are transferred to the target substrate.

In another aspect, there is provided a process for printing a heat transferable image.

The process may comprise:
- electrostatically printing a transparent release composition onto a transfer material to form a release layer disposed on the transfer material;
- electrostatically printing an electrostatic ink composition on the release layer to form an image layer disposed on the release layer; and
- laminating a thermoplastic film to the image layer.

In a further aspect, there is provided a heat transferable printed image. The heat transferable printed image may comprise:
- a transfer material;
- an electrostatically printed transparent release layer disposed on the transfer material;
- an electrostatically printed image layer disposed on the release layer; and
- a thermoplastic film laminated to the image layer.

There is also described herein a heat transfer printed substrate. The heat transfer printed substrate may comprise:
- a fabric;
- an electrostatically printed image layer adhered to the fabric by a thermoplastic material; and
- an electrostatically printed transparent release layer disposed on the image layer.

Figure 1B:
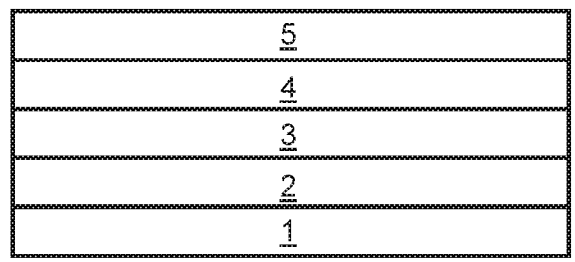
Figure 1C:
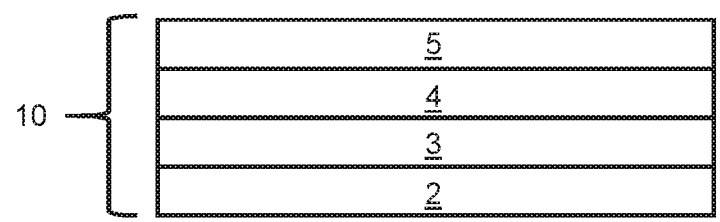
Figure 1C:

FIGS. 1A, 1B and 1C show, schematically, an example of a process for heat transfer printing, as disclosed herein. FIG. 1A shows a heat transferable printed image 8 comprising a transfer material 1 having a transparent release layer 2 disposed thereon, which, in turn has printed thereon an image layer 3, which in turn has a thermoplastic film 4 contacted with, for example, laminated to or placed in contact with, the image layer 3. Both the transparent release composition forming the release layer 2 and the electrostatic ink composition forming the image layer 3 may have been printed by an electrostatic printing process. FIG. 1A also shows a target substrate 5, for example, a fabric, spaced from the heat transferable image 8 comprising the transfer material 1, release layer 2, image layer 3 and thermoplastic film 4.

In FIG. 1B, the target substrate 5 has been brought into contact with the thermoplastic film 4 of the heat transferable printed image 8. Heat is applied to soften the release layer 2 and the thermoplastic film 4.

In FIG. 1C, the target substrate 5 and transfer material 1 have been separated, to provide a transfer material 1 and a heat transfer printed substrate 10 comprising the target substrate 5 having thereon the image layer 3 adhered to the fabric by a thermoplastic material 4; and the transparent release layer 2 disposed on the image layer 3.

Thermoplastic films may be applied directly to a heat transferable printed image without requiring coating equipment and do not require additional drying steps prior to contacting the target substrate with the thermoplastic film during heat transfer printing. Thermoplastic films additionally provide improved adhesion to target substrates. In particular, when the target substrate is a fabric, thermoplastic films (for example, thermoplastic polyurethane films) provide machine washable heat transfer printed images.

Heat Transfer Printing

The process for heat transfer printing may comprise electrostatically printing a transparent release composition onto a transfer material to form a release layer disposed on the transfer material; electrostatically printing an electrostatic ink composition on the release layer to form an image layer disposed on the release layer; contacting a thermoplastic film with the image layer; contacting the thermoplastic film with a target substrate under conditions such that the thermoplastic film adheres to the target substrate and the release layer is softened; and separating the target substrate and the transfer material such that the thermoplastic film, image layer and release layer are transferred to the target substrate.

In some examples, contacting the thermoplastic film with the image layer means laminating the thermoplastic film to the image layer. In some examples, contacting the thermoplastic film with the image layer means placing the thermoplastic film in contact with the image layer. In some examples, contacting the thermoplastic film with the image layer and contacting the thermoplastic film with the target substrate occurs simultaneously.

In some examples, laminating the thermoplastic film to the image layer comprises applying heat to the thermoplastic film. In some examples, laminating the thermoplastic film to the image layer comprises applying pressure to the thermoplastic film. In some examples, laminating the thermoplastic film to the image layer comprises applying heat and pressure to the thermoplastic film.

In some examples, prior to laminating the thermoplastic film to the image layer, a backing paper is contacted with the thermoplastic film. In some examples, the backing paper is removed from the thermoplastic film after the thermoplastic film is laminated to the image layer. In some examples, the backing paper stops the thermoplastic film adhering to the heating element, for example, a heated roller (which may be part of a laminating apparatus), during lamination. In some examples, the backing paper does not adhere to the thermoplastic film during lamination. In some examples, the backing paper protects the thermoplastic film after lamination.

If present, the backing paper is removed from the thermoplastic film prior to contacting the thermoplastic film with the target substrate.

In some examples, laminating the thermoplastic film to the image layer is carried out at a suitable temperature to adhere the thermoplastic film to the image layer, which may be a suitable temperature to allow the image layer (e.g., the thermoplastic resin in the image layer), the thermoplastic film in contact with the image layer, or both to soften or become molten. In some examples, laminating the thermoplastic film to the image layer is carried out at a suitable temperature to soften or melt the image layer (e.g., the thermoplastic resin in the image layer). Although the image layer may be heated to a temperature at which it softens or melts, the intensity and duration of heating means that image quality is not affected. The suitable temperature may be a raised temperature, for example, of 30° C. or above, in some examples, 40° C. or above, 50° C. or above, 60° C. or above, 70° C. or above, 80° C. or above, 90° C. or above, 100° C. or above, 110° C. or above, 120° C. or above, 130° C. or above, 140° C. or above, 150° C. or above, or 180° C. or above. The suitable temperature may be from 30° C. to 100° C., in some examples 30° C. to 90° C., in some examples 30° C. to 70° C., in some examples 40° C. to 80° C. The suitable temperature may be from 50° C. to 250° C., in some examples from 60° C. to 220° C., in some examples from 90° C. to 210° C., in some examples from 90° C. to 130° C., in some examples from 100° C. to 110° C. In some examples, laminating the thermoplastic film to the image layer is carried out at the same temperature as contacting the thermoplastic film with the target substrate under conditions such that the thermoplastic film adheres to the target substrate and the release layer is softened. In some examples, the thermoplastic film comprises a plurality of layers and the thermoplastic film is laminated to (i.e., adheres to) the image layer when the image layer is softened. In some examples, the thermoplastic film comprises a plurality of layers and the thermoplastic film is laminated to (i.e., adheres to) the image layer when the image layer is melted. In some examples, the thermoplastic film comprises a plurality of layers and the thermoplastic film is laminated to (i.e., adheres to) the image layer when the layer in contact with the image layer softens. In some examples, the thermoplastic film comprises a plurality of layers and the thermoplastic film is laminated to (i.e., adheres to) the image layer when the layer in contact with the image layer melts.

The suitable temperature may be a temperature at or above the Vicat softening point of the thermoplastic film, the image layer (e.g., the thermoplastic resin in the image layer), or both, as measured using ASTM D1525. The suitable temperature may be a temperature at or above the freezing point of the thermoplastic film, the image layer (e.g., the thermoplastic resin in the image layer), or both, as measured by Differential Scanning Calorimetry under ASTM D3418. The suitable temperature may be a temperature at or above the melting point of the thermoplastic film, the image layer (e.g., the thermoplastic resin in the image layer), or both, as measured by Differential Scanning Calorimetry under ASTM D3418. Where a plurality of polymers are used in the thermoplastic film, the image layer, or both, the softening point, the freezing point or the melting point, may be measured on the blend of polymers. When the thermoplastic film is made from a plurality of layers, the softening point, freezing point or melting point may be measured on the layer of the thermoplastic film that is in contact with the image layer.

In some examples, the thermoplastic film is not laminated to the image layer prior to the thermoplastic film contacting the target substrate. In some examples, contacting the thermoplastic film with the target substrate under conditions such that the thermoplastic film adheres to the target substrate and the release layer is softened also causes the thermoplastic film to adhere to the image layer.

In some examples, the thermoplastic film adheres to the target substrate when the thermoplastic film is softened. In some examples, the thermoplastic film adheres to the target substrate when the thermoplastic film is melted. In some examples, the thermoplastic film comprises a plurality of layers and the thermoplastic film adheres to the target substrate when the layer in contact with the target substrate softens. In some examples, the thermoplastic film comprises a plurality of layers and the thermoplastic film adheres to the target substrate when the layer in contact with the target substrate melts. In some examples, the conditions required to adhere the thermoplastic film to the target substrate involve the application of heat. In some examples, the conditions required to adhere the thermoplastic film to the target substrate involve the application of pressure. In some examples, the conditions required to adhere the thermoplastic film to the target substrate involve the application of heat and pressure. In some examples, the conditions required to adhere the thermoplastic film to the target substrate are the same as the conditions required to soften the release layer.

In some examples, contacting the thermoplastic film with the target substrate under conditions such that the thermoplastic film adheres to the target substrate and the release layer is softened comprises softening the thermoplastic film and the release layer (e.g., the thermoplastic resin in the release layer). In some examples, contacting the thermoplastic film with the target substrate under conditions such that the thermoplastic film adheres to the target substrate and the release layer is softened comprises melting the thermoplastic film and the release layer (e.g., the thermoplastic resin in the release layer). In some examples, the softening or melting is achieved by the application of heat. In some examples, the softening or melting is achieved by the application of heat and pressure. In some examples, contacting the thermoplastic film with the target substrate under conditions such that the thermoplastic film adheres to the target substrate and the release layer is softened may be carried out at a suitable temperature to allow the thermoplastic film and the release layer to soften or become molten during the contacting. The suitable temperature may be a raised temperature, for example, of 30° C. or above, in some examples, 40° C. or above, 50° C. or above, 60° C. or above, 70° C. or above, 80° C. or above, 85° C. or above, 90° C. or above, 100° C. or above, 110° C. or above, 120° C. or above, 130° C. or above, 140° C. or above, 150° C. or above, or 180° C. or above. The suitable temperature may be from 30° C. to 100° C., in some examples 30° C. to 90° C., in some examples 30° C. to 85° C., in some examples 40° C. to 85° C. The suitable temperature may be from 50° C. to 250° C., in some examples from 60° C. to 220° C., in some examples from 85° C. to 210° C., in some examples from 90° C. to 130° C., in some examples from 100° C. to 110° C.

The suitable temperature may be a temperature at or above the Vicat softening point of the release layer (e.g., the thermoplastic resin in the release layer) and the thermoplastic film, as measured using ASTM D1525. The suitable temperature may be a temperature at or above the freezing point of the release layer (e.g., the thermoplastic resin in the release layer) and the thermoplastic film, as measured by Differential Scanning Calorimetry under ASTM D3418. The suitable temperature may be a temperature at or above the melting point of the release layer (e.g., the thermoplastic resin in the release layer) and the thermoplastic film, as measured by Differential Scanning Calorimetry under ASTM D3418. In some examples, if the image layer is not already adhered to the thermoplastic film, the suitable temperature may be a suitable temperature at or above the softening point, freezing point and/or melting point of the thermoplastic film and of the image layer (e.g., the thermoplastic resin in the image layer). Where a plurality of polymers are used in any of the release layer, the thermoplastic film or the image layer, the softening point, freezing point or the melting point may be measured on the blend of polymers. When the thermoplastic film is made from a plurality of layers, the softening point, freezing point or melting point may be measured on the layer of the thermoplastic film that is in contact with the target substrate. When the thermoplastic film is not already adhered to the image layer and the thermoplastic film is made from a plurality of layers, the softening point, freezing point or melting point may also be measured on the layer of the thermoplastic film that is in contact with the image layer. Alternatively, when the thermoplastic film is not already adhered to the image layer and the thermoplastic film is made from a plurality of layers the softening point, freezing point or melting point of the layer of the thermoplastic film that is in contact with the image layer may be higher than the temperature to which the thermoplastic film is heated. In some examples, when the thermoplastic film is made from a plurality of layers and is not already adhered to the image layer, contacting the thermoplastic film with a target substrate under conditions such that the thermoplastic film adheres to the target substrate and the release layer is softened may comprise softening the layer of the thermoplastic film in contact with the target substrate and softening the image layer but not softening the layer of the thermoplastic film in contact with the image layer.

In some examples, the thermoplastic film may adhere to the target substrate while the thermoplastic film is softened or molten and the target substrate and the transfer material may be separated while the release layer (e.g., the thermoplastic resin in the release layer) is softened or molten.

In some examples, laminating the thermoplastic film with the image layer may involve pressing the thermoplastic film and the transfer material between two members, at least one of which, in some examples, both of which, is/are heated, for example, to a temperature mentioned above. In some examples, contacting the thermoplastic film with the target substrate may involve pressing the transfer material and the target substrate between two members, at least one of which, in some examples, both of which, is/are heated, for example, to a temperature mentioned above. In some examples, the two members may be heated to the same temperature, e.g., to a temperature mentioned above. In some examples, the two members may be heated to different temperatures. In some examples, the two members may be heated to a temperature of 100° C. to 200° C., for example, 130° C. to 170° C., for example 140° C. to 160° C., for example about 150° C. The two members may be rollers and may be part of a lamination apparatus. If the two members are rollers, the speed of passing the target substrate and the transfer material (having the transparent release layer, image layer and thermoplastic film there between) through the rollers may be any suitable speed to allow the release layer to soften or melt and the thermoplastic film to adhere to the image layer or to adhere to the image layer and the target substrate. The speed may be at least 0.1 m/min, in some examples at least 0.5 m/min, in some examples at least 1 m/min. The speed may be at least 10 m/min or less, in some examples 5 m/min or less, in some examples 4 m/min or less, in some examples 3 m/min or less, in some examples, 2 m/min or less. The speed may be of from 0.1 m/min to 10 m/min, in some examples from 0.5 m/min to 5 m/min, in some examples 0.5 m/min to 4 m/min, in some examples 1 m/min to 3 m/min, in some examples, 0.1 m/min to 1 m/min. The speed may be determined depending on the temperature of the rollers, with a higher temperature leading to faster softening/melting of the release layer (e.g., the thermoplastic resin of the release layer) and/or faster adhesion of the thermoplastic film to the image layer or adhesion of the thermoplastic film to the target substrate or adhesion of the thermoplastic film to the image layer and the target substrate, allowing for a higher speed, since the contact time can be less.

Pressure may be applied during the lamination of the thermoplastic film with the image layer. Pressure may be applied during the contacting of the thermoplastic film with the target substrate. The pressure may be a pressure of at least from 1 bar (100 kPa), in some examples at least 2 bar, in some examples from 1 bar to 20 bar, in some examples 2 bar to 10 bar, in some examples 2 bar to 5 bar, in some examples 5 bar to 10 bar.

The contacting under a raised temperature and, in some examples, under pressure, may be carried out for a suitable time period to effect adhesion and to soften the release layer, and the suitable time period may be at least 0.1 seconds, in some examples at least 0.2 seconds, in some examples at least 0.5 seconds, in some examples at least 0.8 seconds, in some examples at least 1 second, in some examples at least 1.2 seconds, in some examples at least 1.5 seconds, in some examples at least 1.8 seconds, in some examples at least 2 seconds. The suitable time period may be from 0.1 seconds to 100 seconds, in some examples, 0.1 seconds to 90 seconds, in some examples, 0.2 seconds to 80 seconds, in some examples, 0.5 seconds to 70 seconds, in some examples, 0.8 seconds to 60 seconds, in some examples, 1 second to 50 seconds, in some examples, 1.2 seconds to 40 seconds, in some examples, 1.5 seconds to 30 seconds, in some examples, 1.8 seconds to 20 seconds, in some examples, 2 seconds to 10 seconds, in some examples 0.5 seconds to 5 seconds. In some examples, there is provided a process for printing a heat transferable image. The process may comprise:

electrostatically printing a transparent release composition onto a transfer material to form a release layer disposed on the transfer material;

electrostatically printing an electrostatic ink composition on the release layer to form an image layer disposed on the release layer;

contacting a thermoplastic film with the image layer;

applying a backing paper to the thermoplastic film; and laminating the thermoplastic film to the image layer.

In some examples, there is provided a process for printing a heat transferable image. The process may comprise:

electrostatically printing a transparent release composition onto a transfer material to form a release layer disposed on the transfer material;

electrostatically printing an electrostatic ink composition on the release layer to form an image layer disposed on the release layer;

contacting a thermoplastic film with the image layer;

applying a backing paper to the thermoplastic film;

laminating the thermoplastic film to the image layer; and removing the backing paper from the thermoplastic film.

In some examples, there is provided a process for printing a heat transfer printed substrate. The process may comprise:

electrostatically printing a transparent release composition onto a transfer material to form a release layer disposed on the transfer material;

electrostatically printing an electrostatic ink composition on the release layer to form an image layer disposed on the release layer;

contacting a thermoplastic film with the image layer;

applying a backing paper to the thermoplastic film;

laminating the thermoplastic film to the image layer;

removing the backing paper from the thermoplastic film;

contacting the thermoplastic film with a target substrate under conditions such that the thermoplastic film adheres to the target substrate and the release layer is softened; and separating the target substrate and the transfer material such that the thermoplastic film, image layer and release layer are transferred to the target substrate.

Electrostatic Printing

The electrostatic printing of the transparent release composition may comprise
forming a latent electrostatic image on a surface;
contacting the surface with the transparent release composition, such that at least some of the transparent release composition adheres to the surface to form a developed toner image on the surface, and transferring the toner image to a print substrate (i.e., the transfer material), in some examples via an intermediate transfer member. The transparent release composition during printing may comprise particles, which may be termed toner particles, the particles comprising a thermoplastic resin, and, in some examples, a charge adjuvant and/or a charge director.

The image layer may be formed by electrostatically printing an electrostatic ink composition comprising a colorant. The image layer may comprise a thermoplastic resin, and a charge adjuvant and/or a charge director. The thermoplastic resin, the charge adjuvant and/or the charge director of the electrostatic ink composition used to form the image may, each, independently, be the same as or different from the thermoplastic resin, the charge adjuvant and/or the charge director of the transparent release composition, and may be selected from the thermoplastic resin, the charge adjuvant and/or the charge director disclosed below in respect of the transparent release composition. The colorant of the electrostatic ink composition used to form the image layer may be selected from a black colorant, a magenta colorant, a cyan colorant and a yellow colorant.

The printing of the image layer may be carried out using an electrostatic printing process, e.g. using the same electrostatic printing apparatus used to print the transparent release composition on the transfer material. The electrostatic printing of the image layer may involve
forming a further latent electrostatic image on a surface;
contacting the surface with an electrostatic ink composition comprising a colorant, such that at least some of the electrostatic ink composition comprising a colorant adheres to the surface to form a developed colorant-containing toner image on the surface, and transferring the toner image to the transparent release composition (e.g. release layer) on the transfer material, in some examples via an intermediate transfer member.

In some examples, the transparent release composition and the electrostatic ink composition are liquid electrostatically printed.

The electrostatic printing of the transparent release composition and the overlying image layer on the transfer material may be carried out in a single pass, e.g. by printing the transparent release composition and the image together onto the transfer material, e.g. such that the image layer overlies the transparent release composition on the transfer material. In some examples, this may involve disposing an image layer (formed with an electrostatic ink composition comprising a colorant) first on an intermediate transfer member in an electrostatic printing process and then forming an overlying layer of transparent release composition on the image layer, and transferring the image layer and the transparent release layer to the transfer material.

The surface on which the latent electrostatic image is formed may be on a rotating member, e.g. in the form of a cylinder. The surface on which the latent electrostatic image is formed may form part of a photo imaging plate (PIP). The contacting may involve passing the transparent release composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the transparent release composition to an electric field having a field gradient of 50-400 V/µm, or more, in some examples 600-900 V/µm, or more.

The intermediate transfer member may be a rotating flexible member, which is in some examples heated, e.g. to a temperature of from 80° C. to 160° C., in some examples from 90° C. to 130° C., in some examples from 100° C. to 110° C.

Heat Transferable Printed Image

In some examples, there is provided a heat transferable printed image comprising a transfer material; an electrostatically printed transparent release layer disposed on the transfer material; an electrostatically printed image layer disposed on the release layer; and a thermoplastic film laminated to the image layer.

In some examples, a backing layer is disposed on the thermoplastic film. In some examples, no backing layer is required.

In some examples, the heat transferable printed image is formed by the process for printing a heat transferable image. In some examples, the process for printing a heat transferable image comprises electrostatically printing a transparent release composition onto a transfer material to form a release layer disposed on the transfer material; electrostatically printing an electrostatic ink composition on the release layer to form an image layer disposed on the release layer; and laminating a thermoplastic film to the image layer. In some examples, a backing paper is applied to the thermoplastic film prior to laminating the thermoplastic film to the image layer. In some examples, applying a backing paper to the thermoplastic film may mean contacting a backing paper with the thermoplastic film. In some examples, the backing paper is removed from the thermoplastic film after the thermoplastic film is laminated to the image layer. The conditions used in the process for printing a heat transferable image may be the same as those used in the process for heat transfer printing described above.

In some examples, the heat transferable printed image is used in the process for heat transfer printing. The process for heat transfer printing may comprise providing a heat transferable printed image, contacting the thermoplastic film with a target substrate under conditions such that the thermoplastic film adheres to the target substrate and the release layer is softened; and separating the target substrate and the transfer material such that the thermoplastic film, image layer and release layer are transferred to the target substrate. If a backing layer is present, the process comprises removing the backing layer prior to contacting the thermoplastic film with the target substrate. The conditions used in this process may be the same as those used in the process for heat transfer printing described above.

Heat Transfer Printed Substrate

In some examples, there is provided a heat transfer printed substrate comprising a target substrate; an electrostatically printed image layer adhered to the target substrate by a thermoplastic material; and an electrostatically printed transparent release layer disposed on the image layer. During production of the heat transfer printed substrate (i.e., during the heat transfer printing process used to form the heat transfer printed substrate), the thermoplastic material may have been a thermoplastic film.

In some examples, there is provided a heat transfer printed substrate comprising a fabric; an electrostatically printed image layer adhered to the fabric by a thermoplastic material; and an electrostatically printed transparent release layer disposed on the image layer.

In some examples, the release layer disposed on the image layer provides a protective layer or an overcoat layer disposed on the image layer.

Thermoplastic Films

The thermoplastic film may comprise a film of any thermoplastic material. The thermoplastic film may comprise a film of any thermoplastic material capable of adhering to the target substrate. The thermoplastic film may comprise a film of any thermoplastic material capable of adhering to the target substrate and the image layer. The thermoplastic film may comprise a film of any thermoplastic material with a softening temperature and/or melting temperature below the softening temperature of the image layer. The thermoplastic film may comprise a film of any thermoplastic material with a softening temperature and/or melting temperature below the melting temperature of the image layer.

In some examples, the thermoplastic film may have a thickness of 35 µm or more, 40 µm or more, 45 µm or more, 50 µm or more, for example, 60 µm or more, 70 µm or more, 80 µm or more, 90 µm or more, 100 µm or more, 110 µm or more, 120 µm or more, 130 µm or more, 140 µm or more, 150 µm or more, 160 µm or more, 170 µm or more, 180 µm or more, 190 µm or more, 200 µm or more, 210 µm or more, 220 µm or more, 230 µm or more, 240 µm or more, 250 µm or more, 260 µm or more, 270 µm or more, 280 µm or more, 290 µm or more, 300 µm or more. In some examples, the thermoplastic film may have a thickness of 300 µm or less, for example, 290 µm or less, 280 µm or less, 270 µm or less, 260 µm or less, 250 µm or less, 240 µm or less, 230 µm or less, 220 µm or less, 210 µm or less, 200 µm or less, 190 µm or less, 180 µm or less, 170 µm or less, 160 µm or less, 150 µm or less, 140 µm or less, 130 µm or less, 120 µm or less, 110 µm or less, 100 µm or less, 90 µm or less, 80 µm or less, 70 µm or less, 60 µm or less, 50 µm or less, 45 µm or less, 40 µm or less, 35 µm or less. In some examples, the thermoplastic film may have a thickness of 35 µm to 300 µm, for example, 40 µm to 290 µm, 45 µm to 280 µm, 50 µm to 270 µm, 60 µm to 260 µm, 70 µm to 250 µm, 80 µm to 240 µm, 90 µm to 230 µm, 100 µm to 220 µm, 50 µm to 210 µm, 60 µm to 200 µm, 70 µm to 190 µm, 80 µm to 180 µm, 90 µm to 100 µm, 100 µm to 160 µm, 50 µm to 150 µm, 60 µm to 140 µm, 70 µm to 130 µm, 80 µm to 120 µm, 90 µm to 110 µm, 50 µm to 100 µm. In some examples, the thermoplastic film may have a thickness of about 100 µm.

In some examples, the thermoplastic film may comprise one or more layers of material. In some examples, the thermoplastic film may comprise two or more layers of material. In some examples, the thermoplastic film may comprise one, two or three layers of material. In some examples, the thermoplastic film may comprise one layer of material, that is, the thermoplastic film may be a monolayer film. In some examples, the thermoplastic film may comprise two layers of material, that is, the thermoplastic film may be a bi-layer film.

In some examples, the thermoplastic film or at least one layer of material in the thermoplastic film that may be or has been placed in contact with the target substrate during heat transfer printing may have a melting temperature of about 40° C. or greater, for example, about 50° C. or greater, about 60° C. or greater, about 70° C. or greater, about 80° C. or greater, about 85° C. In some examples, the thermoplastic film or at least one layer of material in the thermoplastic film that may be or has been placed in contact with the target substrate during heat transfer printing may have a melting temperature of about 150° C. or less, for example, about 140° C. or less, about 130° C. or less, about 120° C. or less, about 110° C. or less, about 100° C. or less, about 90° C. or less. In some examples, the thermoplastic film or at least one layer of material in the thermoplastic film that may be or has been placed in contact with the target substrate during heat transfer printing may have a melting temperature of about 40° C. to about 150° C., for example, about 50° C. to about 140° C., about 60° C. to about 130° C., about 70° C. to about 120° C., about 80° C. to about 110° C., about 85° C. to about 100° C., about 50° C. to about 90° C.

In some examples, the thermoplastic film is a bi-layer film. In some examples, the two layers of the bi-layer film have different melting temperatures. In some examples, the bi-layer comprises a first layer having a first melting temperature and a second layer having a second melting temperature wherein the first melting temperature is lower than the second melting temperature. In some examples, the bi-layer film is contacted with the image layer such that the second layer (i.e., the layer having the higher melting temperature) is contacted with the image layer so that, when contacted with the target substrate, the first layer (i.e., the layer having the lower melting temperature) contacts the target substrate. In some examples, the melting temperature of the first layer is lower than or the same as the melting temperature of the image layer. In some examples, the melting temperature of the first layer is lower than or the same as the softening temperature of the image layer. In some examples, the melting temperature of the second layer is higher than the melting temperature of the image layer. In some examples, the melting temperature of the second layer is higher than the softening temperature of the image layer. In some examples, the melting temperature of the first layer is lower than or the same as the melting temperature of the image layer and the melting temperature of the second layer is higher than the melting temperature of the image layer. In some examples, the melting temperature of the first layer is lower than or the same as the softening temperature of the image layer and the melting temperature of the second layer is higher than the softening temperature of the image layer.

In some examples, the thermoplastic film may be a bi-layer and one layer, which may be the layer that will be or is in contact with the target substrate, may have a melting temperature of about 40° C. or greater, for example, about 50° C. or greater, about 60° C. or greater, about 70° C. or greater, about 80° C. or greater, about 85° C. or greater. In some examples, the thermoplastic film may be a bi-layer and one layer, which may be the layer that will be or is in contact with the target substrate, may have a melting temperature of about 150° C. or less, for example, about 140° C. or less, about 130° C. or less, about 120° C. or less, about 110° C. or less, about 100° C. or less, about 90° C. or less. In some examples, the thermoplastic film may be a bi-layer and one layer, which may be the layer that will be or is in contact with the target substrate, may have a melting temperature of about 40° C. to about 150° C., for example, about 50° C. to about 140° C., about 60° C. to about 130° C., about 70° C. to about 120° C., about 80° C. to about 110° C., about 85° C. to about 100° C., about 50° C. to about 90° C.

In some examples, the thermoplastic film may be a bi-layer and one layer, which may be the layer that will be or is in contact with the image layer, may have a melting temperature of about 100° C. or greater, for example about 110° C. or greater, about 120° C. or greater, about 130° C. or greater, about 140° C. or greater, about 150° C. or greater, about 160° C. or greater. In some examples, the thermoplastic film may be a bi-layer and one layer, which may be the layer that will be or is in contact with the image layer, may have a melting temperature of about 250° C. or less, for example, about 240° C. or less, about 230° C. or less, about 220° C. or less, about 210° C. or less, about 200° C. or less, about 190° C. or less, about 180° C. or less, about 170° C. or less, about 160° C. or less. In some examples, the thermoplastic film may be a bi-layer and one layer, which may be the layer that will be or is in contact with the image layer, may have a melting temperature of about 100° C. to about 250° C., for example, about 110° C. to about 240° C., about 120° C. to about 230° C., about 130° C. to about 220° C., about 140° C. to about 210° C., about 150° C. to about 200° C., about 160° C. to about 190° C., about 100° C. to about 180° C., about 110° C. to about 170° C., about 120° C. to about 160° C.

In some examples, the thermoplastic film may comprise a film of any thermoplastic material capable of adhering the image layer to the target substrate. In some examples, the thermoplastic film may comprise a film of polymeric material. In some examples, the thermoplastic film may comprise a material selected from ethylene vinyl acetate (EVA), polyethylene, polystyrene, polypropylene, polybutene, polyester, poly(meth)acrylate, polyamides, thermoplastic polyimides, styrene block co-polymers (such as styrene-butadiene-styrene, styrene-isoprene-styrene, styrene-ethylene/butylene-styrene and styrene-ethylene/butylene), and thermoplastic polyurethanes. In some examples, the thermoplastic film may comprise thermoplastic polyurethane.

Thermoplastic polyurethanes are a class of polyurethanes comprising linear segmented block co-polymers, which may have hard and soft segments. Thermoplastic polyurethane polymers may be formed by the reaction of three components: polyisocyanates, polyols and so-called chain extenders.

In some examples, the polyisocyanate may be a diisocyanate, a triisocyanate, a tetra isocyanate or a polymeric isocyanate. In some examples, the polyisocyanate may be a diisocyanate or a polymeric isocyanate.

In some examples, the polyisocyanate may be a diisocyanate selected form from (i) aromatic diisocyanates, such as methylene[bis(phenyl isocyanate)] (MDI) (e.g., 4,4'-methylene[bis(phenyl isocyanate)], 2,4'-methylene[bis(phenyl isocyanate)], or 2,2'-methylene[bis(phenyl isocyanate)]), xylylene diisocyanate (XDI) (e.g., m-xylylene diisocyanate), tetra methyl xylylene diisocyanate (e.g., 1,3-bis(1-isocyanato-1-methylethyl)-benzene), phenylene diisocyanate (e.g., 1,3-phenylene diisocyanate, or 1,4-phenylene diisocyanate), naphthalene diisocyanate (e.g., 1,5-naphthalene diisocyanate), dimethyl biphenyl diisocyanate (TODI) (e.g., 3,3'-dimethyl-4,4'-biphenylene diisocyanate), and toluene diisocyanate (TDI) (e.g., 2,4-toluene diisocyanate or 2,6-toluene diisocyanate; (ii) aliphatic diisocyanates, such as isophorone diisocyanate (IPDI), cyclohexyl diisocyanate (CHDI) (e.g., 1,4-cyclohexyl diisocyanate), decane diisocyanate (e.g., decane-1,10-diisocyanate), dodecane diisocyanate (e.g., dodecane-1,12-diisocyanate) hexa-methylene diisocyanate (HDI), cyclohexyl diisocyanate (e.g., 1,4-cyclohexyl diisocyanate), bis(isocyanatomethyl)cyclohexane (CHMDI) (e.g., 1,3-bis(isocyanatomethyl)-cyclohexane, or 1,4-bis(isocyanatomethyl)cyclohexane)), dicyclohexylmethane diisocyanate (HMDI) (e.g., dicyclohexylmethane-4,4'-diisocyanate), hydrogenated diphenylmethane diisocyanate, and hydrogenated tolylene diisocyanate.

In some examples, the polyisocyanate may be a polymeric isocyanate. In some examples, the polymeric isocyanate may be polymeric diphenylmethane isocyanate (pMDI) or polymeric hydrogenated diphenylmethane isocyanate. In some examples, the polymeric isocyanate may be polymeric diphenylmethane diisocyanate (pMDI).

In some examples, the polyol may be a long-chain polyol, wherein a long-chain polyol has a molecular weight of from at least 500 Daltons. In some examples, the polyol comprises a molecule containing multiple hydroxyl functional groups. In some examples, the polyol comprises a polymeric molecule containing multiple hydroxyl functional groups. In some examples, the polyol comprises at least 2 hydroxyl functional groups. In some examples, the polyol comprises 2 hydroxyl functional groups, that is, the polyol is a diol.

In some examples, the polyol comprises a hydroxyl-terminated polymer. In some examples, the polyol comprises a hydroxyl-substituted polymer, that is, a polymer with hydroxyl substituents.

In some examples, the polyol comprises a polyester polyol, a polyether polyol, a polyamide polyol, a polyalkyl polyol, a polyaryl polyol, a polyalkenyl polyol, a polycycloalkyl polyol, a polycycloalkenyl polyol or a polycaprolactone. In some examples, the polyol comprises a polyether polyol.

In some examples, the polyether polyol is a hydroxyl-terminated polyether, that is, a polyether diol. In some examples, the polyether is a polymer of an alkylene glycol. In some examples, the polyether polyol may comprise a polymer of diethylene glycol, dipropylene glycol, 1,4-butane diol, 1,6-hexanediol, 1,3-butanediol, 1,5-pentanediol, 1,4-cyclohexanedimethanol, neopentyglycol, 1,9-nonanediol, 1,12-dodecanediol and the like. In some examples, the polyether polyol may comprise a poly(ethylene glycol) diol, poly(oxypropylene) diol or a poly(oxytetramethylene) diol. In some examples, the polyether polyol may be a polyglycerol, a polysaccharide. In some examples, the polysaccharide may be a polysucrose or polysorbitol.

In some examples, the so-called chain extender may be a diamine or a diol, for example, a short chain diol having a molecular weight of 400 Daltons or less. Suitable chain extenders include glycols and can be aliphatic, aromatic or combinations thereof. In some cases, the chain extenders are glycols having from 2 to about 20 carbon atoms. In some examples, the glycol chain extenders are lower aliphatic or short-chain glycols having from about 4 to about 12 carbon atoms and include, for example, diethylene glycol, dipropylene glycol, 1,4-butane diol, 1,6-hexanediol, 1,3-butanediol, 1,5-pentanediol, 1,4-cyclohexanedimethanol, neopentyglycol, 1,9-nonanediol, 1,12-dodecanediol and the like. In some embodiments, the chain extender is comprised solely of 1,6-hexanediol.

In some examples, the chain extender may comprises an aromatic glycol. In some examples, the aromatic glycol may be benzene glycol or xylene glycol. Xylene glycol may be a mixture of 1,4-di(hydroxymethyl)benzene and 1,2-di(hydroxmethyl)benzene. The benzene glycol may be hydroquinone bis(betahydroxyethyl)ether (HQEE), 1,3-di(2-hydroxyethyl)benzene, 1,2-di(2-hydroxyethoxy)benzene, or combinations thereof. Suitable thermoplastic polyurethane films are available from Novotex™.

Backing Paper

In some examples, the backing paper may refer to a detachable backing paper. The backing paper may stop the thermoplastic film adhering to the heating element during lamination. The backing paper may be any paper substrate capable of stopping the thermoplastic film adhering to the heating element during lamination. In some examples, the backing paper may not adhere to the thermoplastic film during lamination. In some examples, the backing paper is heat resistant. In some examples, the backing paper shows good heat transfer. In some examples, the backing paper may be known as a release liner or release paper.

The backing paper may protect the thermoplastic film after lamination. For example, the backing paper may stop the thermoplastic film adhering to other substrates.

In some examples, the backing paper may be any type of paper, for example, coated paper, uncoated paper or surface modified paper. In some examples, the backing paper may be a silicon liner or silicon paper. In some examples, the backing paper may be any type of paper that does not adhere to the thermoplastic film during or after lamination. In some examples, the backing paper may be kitchen baking paper. In some examples, the backing paper may be silicon or Teflon™ coated paper. In some examples, the backing paper may be coated paper. In some examples, coated paper comprises a paper material coated with a polymeric material. In some examples, coated paper comprises a paper material coated with an inorganic material bound to the surface of the paper by a polymeric material. In some examples, the backing paper may be any type of paper that can be peeled from the thermoplastic film.

Suitable backing paper includes standard kitchen baking paper, silicon release liners, silicon papers and polyethylene terephthalate (PET).

Transparent Release Composition

The transparent release composition may comprise a thermoplastic resin. In some examples, the transparent release composition comprises a thermoplastic resin and a solid polar compound. It may further comprise a charge adjuvant and/or a charge director. The transparent release composition does not contain any pigment, or substantially lacks pigment and thus is a pigment-free, or substantially pigment-free composition. The transparent release composition may otherwise be termed a transparent or colourless electrostatic ink composition or a colorless varnish for digital printing. The transparent release composition may comprise less than 5 wt. % solids of colorant, in some examples less than 3 wt. % solids of colorant, in some examples less than 1 wt. % solids of colorant, in some examples less than 0.5 wt. % solids of colorant, in some examples less than 0.1 wt. % solids of colorant. A "colorant" may be a material that imparts a color to the composition. As used herein, "colorant" includes pigments and dyes, such as those that impart colors such as black, magenta, cyan and yellow to an ink. As used herein, "pigment" generally includes pigment colorants, magnetic particles, aluminas, silicas, and/or other ceramics or organo-metallics. Thus, though the present description primarily exemplifies the use of pigment colorants, the term "pigment" can be used more generally to describe not only pigment colorants, but other pigments such as organometallics, ferrites, ceramics, etc.

The thermoplastic resin may constitute at least 85 wt. % of the solids of the transparent release composition, in some examples at least 90 wt. % of the solids of the transparent release composition, in some examples 95 wt. % of the solids of the transparent release composition.

If a solid polar compound is present, the thermoplastic resin and the solid polar compound together may constitute at least 85 wt. % of the solids of the transparent release composition, in some examples at least 90 wt. % of the solids of the transparent release composition, in some examples 95 wt. % of the solids of the transparent release composition.

The transparent release composition may further comprise one or more additives such as surfactants, viscosity modifiers, emulsifiers and the like.

In some examples, once printed, the transparent release composition forms a release layer of less than 10 μm in thickness, for example less than 9 μm in thickness, less than 8 μm in thickness, less than 7 μm in thickness, less than 6 μm in thickness, less than 5 μm in thickness, less than 4 μm in thickness, less than 3 μm in thickness, less than 2 μm in thickness, less than 1.5 μm in thickness. In some examples, the transparent release composition forms a release layer having a thickness of about 1 μm.

In some examples, once printed, the transparent release composition forms a release layer having a thickness of greater than 0.1 μm, for example greater than 0.2 μm, greater than 0.3 μm, greater than 0.4 μm, greater than 0.5 μm, greater than 0.6 μm, greater than 0.7 μm, greater than 0.8 μm, greater than 0.9 μm.

In some examples, once printed, the transparent release composition forms a release layer having a thickness of 0.1 μm to 10 μm, for example, 0.2 μm to 9 μm, 0.3 μm to 8 μm, 0.4 μm to 7 μm, 0.5 μm to 6 μm, 0.6 μm to 5 μm, 0.7 μm to 4 μm, 0.8 μm to 3 μm, 0.9 to 2 μm, 0.1 μm to 1.5 μm.

Liquid Carrier

In some examples, when printing, the transparent release composition comprises a liquid carrier. Generally, the liquid carrier can act as a dispersing medium for the other components in the transparent release composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about 109 ohm·cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof.

Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-MT™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0

Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before electrostatic printing, the liquid carrier can constitute about 20% to 99.5% by weight of the transparent release composition, in some examples 50% to 99.5% by weight of the transparent release composition. Before printing, the liquid carrier may constitute about 40% to 90% by weight of the transparent release composition. Before printing, the liquid carrier may constitute about 60% to 80% by weight of the transparent release composition. Before printing, the liquid carrier may constitute about 90% to 99.5% by weight of the transparent release composition, in some examples 95% to 99% by weight of the transparent release composition.

The transparent release composition, once electrostatically printed on the transfer material as the release layer, may be substantially free from liquid carrier. In an electrostatic printing process and/or afterwards, the liquid carrier may be removed, e.g. by an electrophoresis processes during printing and/or evaporation, such that substantially just solids are transferred to the transfer material. Substantially free from liquid carrier may indicate that the release layer printed on the transfer material contains less than 5 wt. % liquid carrier, in some examples, less than 2 wt. % liquid carrier, in some examples less than 1 wt. % liquid carrier, in some examples less than 0.5 wt. % liquid carrier. In some examples, the release layer printed on the transfer material is free from liquid carrier.

Thermoplastic Resin

In some examples, the transparent release composition comprises a thermoplastic resin. In some examples, the transparent release composition comprises chargeable particles (i.e. having or capable of developing a charge, for example in an electromagnetic field) including the thermoplastic resin, in some examples including the thermoplastic resin and the solid polar compound.

The thermoplastic resin may be any thermoplastic resin that is able to swell in a carrier liquid, for example a non-polar carrier liquid, as described herein. By swelling, it is meant that the resin is capable of increasing in size as a result of accumulation of the carrier liquid, e.g. non-polar carrier liquid. The swellable thermoplastic resin is also able to emit the carrier liquid when phase separation is initiated (e.g., when the swollen resin is exposed to heat at a temperature ranging from about 50° C. to about 80° C.). Examples of the swellable resin include ethylene acrylic acid copolymers and/or ethylene methacrylic acid copolymers. Both ethylene acrylic acid copolymers and ethylene methacrylic acid copolymers are commercially available under the tradename NUCREL® from E. I. du Pont de Nemours and Company, Wilmington, Del. The swelling of these types of resins may be due, at least in part, to the molecular structure similarity between the ethylene-based resin(s) and the non-polar carrier liquid. It is to be understood that any other homopolymer or copolymer that is capable of swelling in a non-polar carrier liquid and is also capable of releasing the non-polar carrier liquid when exposed to suitable heat conditions may also be used.

The thermoplastic resin may comprise a copolymer of an alkylene monomer and a monomer selected from acrylic acid and methacrylic acid. The thermoplastic resin may be referred to as a thermoplastic polymer. In some examples, the polymer may comprise one or more of ethylene or propylene acrylic acid co-polymers; ethylene or propylene methacrylic acid co-polymers; ethylene vinyl acetate co-polymers; co-polymers of ethylene or propylene (e.g. 80 wt. % to 99.9 wt. %), and alkyl (e.g. C1 to C5) ester of methacrylic or acrylic acid (e.g. 0.1 wt. % to 20 wt. %); co-polymers of ethylene (e.g. 80 wt. % to 99.8 wt. %), acrylic or methacrylic acid (e.g. 0.1 wt. % to 20 wt. %) and alkyl (e.g. C1 to C5) ester of methacrylic or acrylic acid (e.g. 0.1 wt. % to 20 wt. %); co-polymers of ethylene or propylene (e.g. 70 wt. % to 99.9 wt. %) and maleic anhydride (e.g. 0.1 wt. % to 30 wt. %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt. % to 20 wt. %)/ethylhexylacrylate (e.g. 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers and combinations thereof.

The thermoplastic resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The thermoplastic resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitutes from 5 wt. % to about 25 wt. % of the co-polymer, in some examples from 10 wt. % to about 20 wt. % of the co-polymer.

The thermoplastic resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The thermoplastic resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The thermoplastic resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The thermoplastic resin may comprise a first polymer having a melt viscosity of 15000 poise or more, in some examples 20000 poise or more, in some examples 50000 poise or more, in some examples 70000 poise or more; and in some examples, the thermoplastic resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The thermoplastic resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel® 960 (from DuPont), an example of the second polymer is Nucrel® 699 (from DuPont), and an example of the third polymer is AC®-5120 or AC®-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the thermoplastic resin comprises a single type of polymer, the polymer (excluding any other components of the electrophotographic adhesive composition) may have a melt viscosity of 6000 poise or more, in some examples a melt viscosity of 8000 poise or more, in some examples a melt viscosity of 10000 poise or more, in some examples a melt viscosity of 12000 poise or more. If the thermoplastic resin comprises a plurality of polymers all the polymers of the resin may together form a mixture (excluding any other components of the electrophotographic adhesive composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The thermoplastic resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SUR-LYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt. % to about 16 wt. % of the co-polymer, in some examples 10 wt. % to 16 wt. % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt. % to about 30 wt. % of the co-polymer, in some examples from 14 wt. % to about 20 wt. % of the co-polymer, in some examples from 16 wt. % to about 20 wt. % of the co-polymer in some examples from 17 wt. % to 19 wt. % of the co-polymer.

The thermoplastic resin may comprise a polymer having acidic side groups, as described above (which may be free of ester side groups), and a polymer having ester side groups. The polymer having ester side groups may be a thermoplastic polymer.

The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. In some examples, the first monomer can constitute 5% to 40% by weight of the co-polymer and the second monomer can constitute 5% to 40% by weight of the co-polymer, with the third monomer constituting the remaining weight of the co-polymer. In some examples, the first monomer constitutes 5% to 15% by weight of the co-polymer and the second monomer constitutes 5% to 15% by weight of the co-polymer, with the third monomer constituting the remaining weight of the co-polymer. In some examples, the first monomer constitutes 8% to 12% by weight of the co-polymer and the second monomer constitutes 8% to 12% by weight of the co-polymer, with the third monomer constituting the remaining weight of the co-polymer. In some examples, the first monomer constitutes about 10% by weight of the co-polymer and the second monomer constitutes about 10% by weight of the co-polymer, and with the third monomer constituting the remaining weight of the co-polymer. The polymer may be selected from the Bynel® class of monomer, including Bynel® 2022 and Bynel® 2002, which are available from DuPont®.

The polymer having ester side groups may constitute 1% or more by weight of the total amount of the thermoplastic resin, e.g. thermoplastic resin polymers, in the transparent release composition and/or the release layer printed on the transfer material or the target substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the transparent release composition and/or the release layer printed on the transfer material or the target substrate. The polymer having ester side groups may constitute from 5% to 50% by weight of the total amount of the resin polymers, e.g. thermoplastic resin polymers, in the transparent release composition and/or the release layer printed on the transfer material or the target substrate, in some examples 10% to 40% by weight of the total amount of the resin polymers, e.g. thermoplastic resin polymers, in the transparent release composition and/or the release layer printed on the transfer material or the target substrate, in some examples 5% to 30% by weight of the total amount of the resin polymers, e.g. thermoplastic resin polymers, in the transparent release composition and/or the release layer printed on the transfer material or the target substrate, in some examples 5% to 15% by weight of the total amount of the resin polymers, e.g. thermoplastic resin polymers, in the transparent release composition and/or the release layer printed on the transfer material or the target substrate, in some examples 15% to 30% by weight of the total amount of the resin polymers, e.g. thermoplastic resin polymers, in the transparent release composition and/or the release layer printed on the transfer material or the target substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel® family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002™, Bynell 2014™, Bynell 2020™ and Bynell 2022™, (sold by E. I. du PONT™)), the AC® family of toners (e.g.

AC-5120™, AC-5180™, AC-540™, AC-580™ (sold by Honeywell™)), the Aclyn™ family of toners (e.g. Aclyn 201™, Aclyn 246™, Aclyn 285™, and Aclyn 295™), and the Lotader™ family of toners (e.g. Lotader 2210™, Lotader, 3430™, and Lotader 8200™ (sold by Arkema™)).

The thermoplastic resin of the transparent release composition or release layer may be softened to allow transfer of the heat transferable image from the transfer material to a target substrate.

In some examples, the thermoplastic resin may have a softening point (e.g. Vicat softening point as measured according to ASTM D1525 or the Ring and Ball softening point as determined according to ASTM E28-99) of about 30° C. or greater, for example about 40° C. or greater, about 50° C. or greater, or about 60° C. or greater.

In some examples, the thermoplastic resin may have a softening point (e.g. Vicat softening point as measured according to ASTM D1525 or the Ring and Ball softening point as determined according to ASTM E28-99) of up to about 150° C., for example up to about 130° C., up to about 120° C., up to about 110° C., or up to about 100° C.

In some examples, the thermoplastic resin may have a softening point (e.g. Vicat softening point as measured according to ASTM D1525 or the Ring and Ball softening point as determined according to ASTM E28-99) in the range of about 60° C. to about 150° C., for example about 60° C. to about 110° C.

Charge Director and Charge Adjuvant

In some examples, the transparent release composition includes either a charge director or a charge adjuvant or both.

In some examples, the transparent release composition includes a charge director. The charge director may be added to a transparent release composition in order to impart and/or maintain sufficient electrostatic charge on the particles of the composition. In some examples, the charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of a transparent release composition.

The charge director may be added in order to impart and/or maintain sufficient electrostatic charge on particles of the transparent release composition, which may be particles comprising the thermoplastic resin and/or a solid polar compound.

In some examples, the transparent release composition comprises a charge director comprising a simple salt. The ions constructing the simple salts are all hydrophilic. The simple salt may include a cation selected from the group consisting of Mg, Ca, Ba, $NH_4$, tert-butyl ammonium, $Li^+$, and $Al^{3+}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof.

In some examples, the transparent release composition comprises a charge director comprising a sulfosuccinate salt of the general formula $MA_n$, wherein M is a metal, n is the valence of M, and A is an ion of the general formula (I): $[R^1—O—C(O)CH_2CH(SO_3^-)-C(O)—O—R^2]$, wherein each of $R^1$ and $R^2$ is an alkyl group. In some examples each of $R^1$ and $R^2$ is an aliphatic alkyl group. In some examples, each of $R^1$ and $R^2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R^1$ and $R^2$ are the same. In some examples, at least one of $R^1$ and $R^2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula $MA_n$ is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples 2 nm or more.

In some examples, the charge director constitutes about 0.001% to 20%, in some examples 0.01% to 20% by weight, in some examples 0.01 to 10% by weight, in some examples 0.01% to 1% by weight of the solids of a transparent release composition. In some examples, the charge director constitutes about 0.01% to 0.5% by weight of the solids of the transparent release composition, in some examples 0.05% to 0.5% by weight of the solids of a transparent release composition, in some examples 0.1% to 2% by weight of the solids of the transparent release composition, in some examples 0.2% to 1.5% by weight of the solids of the transparent release composition in some examples 0.1% to 1% by weight of the solids of the transparent release composition, in some examples 0.1% to 0.3% by weight of the solids of the transparent release composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the transparent release composition).

A charge adjuvant may promote charging of the particles when a charge director is present in the transparent release composition during printing. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1% to 5% by weight, in some examples about 0.1% to 1% by weight, in some examples about 0.3% to 0.8% by weight of the solids of the transparent release composition, in some examples about 1 wt. % to 3 wt. % of the solids of the transparent release composition, in some examples about 1.5 wt. % to 2.5 wt. % of the solids of the transparent release composition.

In some examples, the transparent release composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt. % to 5 wt. % of the solids of the transparent release composition, in some examples in an amount of 0.1 wt. % to 2 wt. % of the solids of the transparent release composition, in some examples in an amount of 0.1 wt. % to 2 wt. % of the solids of the transparent release composition, in some examples in an amount of 0.3 wt. % to 1.5 wt. % of the solids of the transparent release composition, in some examples about 0.5 wt. % to 1.2 wt. % of the solids of the transparent release composition, in some examples about 0.8 wt. % to 1 wt. % of the solids of the transparent release composition, in some examples about 1 wt. % to 3 wt. % of the solids of the transparent release composition, in some examples about 1.5 wt. % to 2.5 wt. % of the solids of the transparent release composition.

Solid Polar Compound

The transparent release composition may further comprise a solid polar compound. The solid polar compound contains polar atoms, such as oxygen, nitrogen, etc., that prevent the solid compounds from dissolving or even swelling in a non-polar carrier liquid. As such, the solid polar compounds do not interact with the non-polar carrier liquid, but rather are dispersed in the thermoplastic resin. In some examples, the solid polar compound is a solid (e.g., at room temperature, i.e., from about 20° C. to about 25° C.), colorless organic material. The solid organic material may be a polymeric material or a non-polymeric material. The solid polar compound may be an organic particle that is resistant to swelling or dissolving in a non-polar carrier fluid, e.g. an isoparaffinic fluid as described herein. The solid polar compound may be dispersed in the thermoplastic resin, and, in some examples, is present in an amount up to 60 wt. % of solids in the transparent release composition. The solid polar compound may be selected from the group consisting of a saccharide, polyacrylic acid, polyvinyl alcohol, styrene maleic anhydride, a bismaleimide oligomer, a cellulose derivative and an aliphatic urethane acrylate.

In some examples, the transparent release composition comprises a saccharide. In some examples, the saccharide may be a modified saccharide. In some examples, modified saccharides are acetylated saccharides. In some examples, the transparent release composition comprises a disaccharide, e.g. a modified disaccharide. In some examples, the transparent release composition comprises a saccharide, e.g. a modified saccharide. In some examples, the saccharide may be selected from maltose, maltose monohydrate, sucrose, sucrose octanoate, sucrose octaacetate, dextrin, xylitol and sucrose benzoate.

In some examples, the transparent release composition comprises a saccharide in an amount of greater than 15 wt. % of the non-volatile solids in the transparent release composition, for example, in an amount of greater than 20 wt. % of the non-volatile solids in the transparent release composition, for example in an amount of greater than 25 wt. % of the non-volatile solids in the transparent release composition, for example in an amount of greater than 30 wt. % of the non-volatile solids in the transparent release composition. In some examples, the transparent release composition comprises a saccharide in an amount of less than 60 wt. % of the non-volatile solids in the transparent release composition, for example less than 50 wt. % of the non-volatile solids in the transparent release composition, for example less than 45 wt. % of the non-volatile solids in the transparent release composition, for example less than 40 wt. % of the non-volatile solids in the transparent release composition.

In some examples, the solid polar compound has a particle size from about 30 nm to about 300 nm, for example from about 50 nm to about 150 nm, or from about 70 nm to about 130 nm. The particle size of the solid polar compound may be the average particle size as determined by SEM, for example the average particle size of 100 particles as determined using SEM. In some examples, the particle size may be the average particle size determined using a Malvern particle size analyser.

Examples of commercially available styrene maleic anhydrides include copolymers from Sartomer Co. USA, LLC, such as SMA® 40001, SMA® 10001, and SMA® 1000P.

Examples of cellulose derivatives include sodium carboxylmethyl cellulose and cellulose acetate propionate. A suitable example of a bismaleimide oligomer is bis-stearamide, and a suitable example of an aliphatic urethane acrylate is REAFREE® UV ND-2335 from Arkema, Spain.

It is to be understood that these solid polar compounds are examples, and that any other organic material that includes polar atoms and is resistant to swelling or dissolving in a non-polar carrier fluid may be used.

Other Additives

The transparent release composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the release composition to the transfer material, e.g. from an intermediate transfer member, which may be a heated blanket.

Target Substrate

The target substrate may be any suitable medium. The target substrate may be any suitable medium capable of having an image printed thereon. The target substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. The metal may be an elemental metal or a metal in alloy form. The material may comprise wood or glass and may be in sheet form. In an example, the target substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The target substrate is, in some examples, a cellulosic print medium such as paper. The cellulosic print medium is, in some examples, a coated cellulosic print medium.

In some examples, the target substrate comprises a film or sheet of at least one of paper, metallic foil, and plastic. In some examples, the target substrate is transparent. In some examples, the target substrate comprises a metallized paper or a metallized plastic film. In some examples, the target substrate comprises an aluminium foil. In some examples the target substrate comprises a film of a plastic material, for example, polyethylene (PE), linear low density polyethylene (LLDPE), low density polyethylene (LDPE), polypropylene (PP), biaxially oriented polypropylene (BOPP). In some examples, the target substrate comprises a metallized paper in the form of a paper substrate coated on one surface with a layer of metal, for example aluminium. In some examples, the target substrate comprises a metallized plastic film in the form of a polymer substrate coated on one surface with a layer of metal, for example aluminium. In some examples, the target substrate comprises a metallized plastic film in the form of a metallized BOPP film, a metallized PET film, or a metallized polyethylene (PE) film.

In some examples, the target substrate comprises any suitable textile or fabric substrate. In some examples, the textile or fabric substrate may be a network of natural or synthetic fibres. The textile or fabric substrate may be woven or non-woven. The textile or fabric substrate may be formed of yarns, for example, spun threads or filaments, which may be natural or synthetic material or a combination thereof. The textile or fabric substrate may include substrates that have fibres that may be natural and/or synthetic. The target substrate may comprise any textile, fabric material, fabric clothing, or other fabric product onto which it is desired to apply printed matter.

The term "textile" includes, by way of example, cloth, fabric material, fabric clothing or other fabric products. The textile substrate may have warp and weft yarns. The terms "warp" and "weft" refer to weaving terms that have their ordinary meaning in the textile arts, that is, warp refers to lengthwise or longitudinal yarns on a loom whereas weft refers to crosswise or transverse yarns on a loom. The textile substrate may be woven, non-woven, knitted, tufted, crocheted, knotted, and/or have a pressed structure.

It is notable that the term "textile" or "fabric" substrate does not include materials commonly known as any kind of paper. Paper takes the form of sheets, rolls and other physical forms which are made of various plant fibres (like trees) or a mixture of plant fibres with synthetic fibres laid down on a fine screen from a suspension in water.

Furthermore, textile substrates include both textiles in filament form, in the form of fabric material, or even in the form of fabric that has been crafted into a finished article (such as clothing, blankets, tablecloths, napkins, bedding material, curtains, carpet, shoes). In some examples, the textile substrate has a woven, knitted, non-woven or tufted structure.

The textile substrate may be a woven fabric in which warp yarns and weft yarns are mutually positioned at an angle of about 90°. The woven fabric may include, but is not limited to, fabric with a plain weave structure, fabric with a twill weave structure in which the twill weave structure produces diagonal lines on a face of the fabric, or a satin weave. The textile substrate may be a knitted fabric with a loop structure including one or both of a warp-knit fabric and a weft-knit fabric. A weft-knit fabric refers to a knitted fabric in which the loops in the fabric structure that are formed from a separate yarn are mainly introduced in a longitudinal fabric direction. A warp-knit fabric refers to a knitted fabric in which the loops in the fabric structure that are formed from a separate yarn are mainly introduced in a transverse fabric direction. The textile substrate may also be a non-woven product, for example, a flexible fabric that includes a plurality of fibres or filaments that are one or both of bonded together and interlocked together by a chemical treatment process (e.g., a solvent treatment), a mechanical treatment process (e.g., embossing), a thermal treatment process, or a combination of two or more of these processes.

The textile substrate may include one or both of natural fibres and synthetic fibres. Natural fibres that may be used include, but are not limited to, wool, cotton, silk, linen, jute, flax or hemp. Additional fibres that may be used include, but are not limited to, rayon fibres, or thermoplastic aliphatic polymeric fibres derived from renewable resources, including but not limited to, corn starch, tapioca products, or sugarcanes. These additional fibres may be referred to as "natural" fibres. In some examples, the fibres used in the textile substrate include a combination of two or more from the above-listed natural fibres, a combination of any of the above-listed natural fibres with another natural fibre or with a synthetic fibre, or a mixture of two or more from the above-listed natural fibres, or a mixture of any thereof with another natural fibre or with a synthetic fibre.

Synthetic fibres that may be used include polymeric fibres including, but not limited to, polyvinyl chloride (PVC) fibres, polyester (such as polyethylene terephthalate, or polybutylene terephthalate), polyamide, polyimide, polyacrylic, polypropylene, polyethylene, polyurethane, polystyrene, polyaramid (e.g., Kevlar®), polytetrafluoro-ethylene (e.g., Teflon®) (both trade marks of E. I. du Pont de Nemours and Company), fibreglass, polytrimethylene and polycarbonate. In some examples, the fibre used in the textile substrate includes a combination of two or more of the fibres, a combination of any of the fibres with another polymeric fibre or with a natural fibre, a mixture of two or more of the fibres, or a mixture of any of the fibres with another polymer fibre or with a natural fibre. In some examples, the synthetic fibre includes modified fibres. The term "modified fibres" refers to one or both of the polymeric fibre and the fabric as a whole having undergone a chemical or physical process such as, but not limited to, one or more of a copolymerisation with monomers or other polymers, a chemical grafting reaction to contact a chemical functional group with one or both the polymeric fibre and a surface of the fabric, a plasma treatment, a solvent treatment, for example, acid etching, and a biological treatment, for example, an enzyme treatment or antimicrobial treatment to prevent biological degradation. In some examples, the textile substrate is PVC-free. The term "PVC-free" means no polyvinyl chloride polymer or vinyl chloride monomer units are in the textile substrate. In some examples, the textile substrate is a synthetic polyester fibre or is formed from a synthetic polyester fibre.

The textile substrate may contain both natural fibres and synthetic fibres. In some examples, the amount of synthetic fibres represents from about 20% to about 90% of the total amount of fibres. In some other examples, the amount of natural fibres represents from about 10% to about 80% of the total amount of fibres. In some examples, the textile substrate comprises natural fibres and synthetic fibres in a woven structure, the amount of natural fibres is about 10% of a total fibre amount and the amount of synthetic fibres is about 90% of the total fibre amount.

The textile substrate may further contain additives including, but not limited to, one or more of, for example, colorant (e.g., pigments, dyes, tints), antistatic agents, brightening agents, nucleating agents, antioxidants, UV stabilizers, fillers and lubricants. Alternatively, the textile substrate may be pre-treated in a solution containing the substances listed above before the target substrate, i.e., the textile substrate, is contacted with the thermoplastic film.

Examples of textiles include synthetic fabrics, such as polyethylene terephthalate (PET), nylon, and/or polyester. The synthetic fabric may be a woven or non-woven fabric. In one example, a PET substrate is coated, for example, on one (e.g., back or front) or both sides with a coating, such as nylon and/or polyester. An example of a two-side-coated PET fabric is Product code 7280N, available from Cole Fabrics Far East, which is a white dip-coated nylon/polyester blend taffeta with a slit edge.

In some examples, the target substrate comprises a fabric, for example a woven fabric, a knitted fabric or a non-woven fabric. A fabric may be a cloth made from yarn or fibres by weaving, knitting, felting or other techniques. In some examples, the target substrate comprises a fabric formed from yarns comprising material selected from polyester, polyamides, polyvinyl alcohols, lyocell, rayon, viscose, nylon, cotton, linen, flax, hemp, jute and wool, acetates, acrylic, elastane, silk or any combination thereof.

In some examples, the target substrate has a thickness of less than 100 µm, for example less than 90 µm, less than 80 µm, less than 70 µm, less than 60 µm, less than 50 µm, less than 40 µm, less than 30 µm, less than 20 µm, less than 15 µm. In some examples, the target substrate has a thickness of greater than 12 µm, for example greater than 15 µm, greater than 20 µm, greater than 30 µm, greater than 40 µm, greater than 50 µm, greater than 60 µm, greater than 70 µm, greater than 80 µm, greater than 90 µm.

In some examples, the target substrate is a textile or fabric substrate and has a thickness of 100 µm or more, for example, 110 µm or more, 120 µm or more, 130 µm or more, 140 µm or more, 150 µm or more, 160 µm or more, 170 µm or more, 180 µm or more, 190 µm or more, 200 µm or more.

In some examples, the target substrate is a textile or fabric substrate and has a thickness of 400 µm or less, for example, 390 µm or less, 380 µm or less, 370 µm or less, 360 µm or less, 350 µm or less, 340 µm or less, 330 µm or less, 320 µm or less, 300 µm or less.

In some examples, the target substrate is a textile or fabric substrate and has a thickness of 100 µm to 400 µm, for example, 110 µm to 390 µm, 120 µm to 380 µm, 130 µm to 370 µm, 140 µm to 360 µm, 150 µm to 350 µm, 160 µm to 340 µm, 170 µm to 330 µm, 180 µm to 320 µm, 190 µm to 310 µm, 200 µm to 300 µm.

Transfer Material

The transfer material may be a material which conducts heat and on which the transparent release composition is electrostatically printed. The image layer is printed on the transfer material in reverse of how the image is to appear on the target substrate. The transfer material may also be referred to as the "label sheet" or the "ribbon". The transfer material may be a material that is different from the target substrate. For example, if the target substrate is or comprises a fabric, the transfer material may be a non-fabric material, e.g. a polymer film or a paper substrate.

The transfer material may be any suitable transfer medium for use in thermal transfer printing. The transfer material may be any suitable medium capable of having an image printed thereon, i.e. an image formed of the transparent release composition and the electrostatic ink composition. In some examples, the transfer material comprises a material selected from a polyester film (such as a polyethylene terephthalate (PET) film), a polyvinyl chloride (PVC) film and a polyethylene film.

The transfer medium may comprises an amorphous (non-crystalline) polyester, such as amorphous polyethylene terephthalate (APET).

In some examples, the transfer material is to allow good thermal transfer. In some examples, the transfer material comprises a film of material, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. The transfer material may be in the form of a sheet or film and/or may have a thickness of from 5 µm to 250 µm, in some examples from 5 µm to 100 µm, in some examples from 5 µm to 50 µm, in some examples 5 to 20 µm or in some examples from 100 µm to 250 µm.

The transfer material may comprise a plurality of layers, e.g. a layer comprising a material selected from a polyester film (such as a polyethylene terephthalate (PET) film), a polyvinyl chloride (PVC) film and a polyethylene film, and a further layer, which may be a primer layer, onto which the transparent release composition is printed.

The transfer material may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), and mixtures thereof. In an example, the transfer material includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The transfer material is, in some examples, a cellulosic print medium such as paper. The cellulosic print medium is, in some examples, a coated cellulosic print medium.

In one example, the transfer material comprises a film or sheet of at least one of paper, metallic foil, and plastic. In one example, the transfer material is transparent. In one example, the transfer material comprises a metallized paper or a metallized plastic film. In one example, the transfer material comprises an aluminium foil. In one example the transfer material comprises a film of a plastic material, for example, polyethylene (PE), linear low density polyethylene (LLDPE), low density polyethylene (LDPE), polypropylene (PP), biaxially oriented polypropylene (BOPP). In one example, the transfer material comprises a metallized paper in the form of a paper substrate coated on one surface with a layer of metal, for example aluminium. In one example, the transfer material comprises a metallized plastic film in the form of a polymer substrate coated on one surface with a layer of metal, for example aluminium. In one example, the transfer material comprises a metallized plastic film in the form of a metallized BOPP film, a metallized PET film, or a metallized polyethylene (PE) film.

In some examples, the transfer material is subjected to a corona treatment prior to printing the transparent release composition, which may also improve bond strength of the transparent release composition to the transfer material.

Image Layer

The transparent release composition on the transfer material has printed thereon an image, which may be said to form an image layer. The image layer may comprise a colorant selected from a black colorant, a magenta colorant, a yellow colorant and a cyan colorant, or a combination thereof.

In some examples, the image or image layer is printed on the transparent release composition on the transfer material in an electrostatic printing process using an electrostatic ink composition comprising a colorant, a thermoplastic resin and a charge director and/or a charge adjuvant. For example, a liquid electrostatic ink composition comprising a colorant, a thermoplastic resin and a charge director and/or a charge adjuvant dispersed in a carrier liquid. Any suitable colorant can be used, for example a pigment. The thermoplastic resin, charge director, charge adjuvant, carrier liquid and/or additives may be as described in relation to the transparent release composition. In some examples, the electrostatic ink composition may be a commercially available liquid electrostatic ink, for example CMYK Electrolnks® available from HP Indigo™.

The image or information may be mirror printed onto the transfer material such that the image transferred to the target substrate appears as the image input in a digital printing process. In some examples, the image or information may be printed to the transfer material such that the image when viewed on the transfer material appears as the image input in a digital printing process, for example in cases in which the target substrate is transparent, e.g. glass, and the image is to be viewed through the target substrate.

EXAMPLES

The following illustrates examples of the methods and other aspects described herein. Thus, these Examples should not be considered as limitations of the present disclosure, but are merely in place to teach how to make examples of the present disclosure.

Materials

The following materials are used in the examples:

Isopar L: an isoparaffinic oil comprising a mixture of C11-C13 isoalkanes (produced by ExxonMobil™; CAS number 64742-48-9).

Nucrel 699™: a copolymer of ethylene and methacrylic acid, made with nominally 11 wt. % methacrylic acid (available from DuPont™).

A-C 5120™: a copolymer of ethylene and acrylic acid with an acid number of 112-130 KOH/g (available form Honeywell™).

Maltose monohydrate: a solid polar compound in the transparent release composition (available from Fisher™).

NCD (natural charge director): KT (natural soya lecithin in phospholipids and fatty acids), BBP (basic barium petronate, i.e., a barium sulfonate salt of a 21-26 carbon hydrocarbon alkyl, available from Cemtura™), and GT (dodecyl benzene sulfonic acid isopropyl amine, supplied by Croda™). The composition being 6.6 wt. % KT, 9.8 wt. % BBP and 3.6 wt. % GT and balance (80 wt. %) Isopar L™.

VCA: an aluminium stearate (available from Sigma-Aldrich™).

Electrolnk® 4.5: the electrostatic ink compositions used to provide the image layer were the cyan, magenta, yellow and black Electrolnk® 4.5 electrostatic inks (available from HP Indigo™). These inks comprise a thermoplastic resin (Nucrel 699™ and A-C 5120™ in a 4:1 ratio by weight), charge adjuvant (VCA) and pigment in Isopar L™.

Polyethylene terephthalate (PET): a 12 μm thick polyethylene terephthalate substrate (obtained from Polyplex Corporation).

Thermoplastic polyurethane: a 100 μm thick bi-layer thermoplastic polyurethane film in which one layer of the bi-layer film (which will be contacted with the target material, that is, the fabric) has a melting point of 85° C. and the second layer of the bi-layer film (which will be contacted with the image layer) has a melting point of 160° C. Both layers of the thermoplastic polyurethane film are thermoplastic polyether polyurethane layers.

Transparent Release Composition

A transparent release composition was prepared by providing 73.14 g of a paste containing 35 wt. % of the thermoplastic resin (Nucrel 699™ and A-C 5120™ in a ratio of 1:4 by weight), 35 wt. % maltosemonohydrate, 1.0 wt. % aluminium stearate (grinding aid material/charge adjuvant, available from Sigma Aldrich™) in Isopar L™ and grinding using a laboratory attritor (S0 from Union Process USA) at 25° C. for 24 hours. The composition was then diluted to 2 wt. % solids with Isopar L™ and charged by adding 8 mL of commercially available HP Indigo™ Imaging Agent (NCD) and left overnight.

Example 1

The transfer material (PET) was corona treated (700 kW). A liquid electrostatic printing apparatus (Indigo™ 6700 printing press from Hewlett-Packard™) was then used to electrostatically print the transparent release composition onto the transfer material (PET) to form a release layer (one separation) disposed on the transfer material and subsequently to electrostatically print the electrostatic ink composition (ElectroInk™ 4.5) on the release layer to provide an image layer disposed on the release layer.

The thermoplastic polyurethane film was then contacted with the image layer. A cotton t-shirt (the target substrate) was then contacted with the thermoplastic film. This construction was passed between two heated rollers, each roller at a temperature of 150° C., at a speed of 1 m/min and a pressure of 1 bar. The transfer material (PET) was then separated from the cotton t-shirt (target substrate) such that the thermoplastic film, image layer and release layer were transferred to the cotton t-shirt.

Example 2

A heat transfer printed fabric was produced according to Example 1 except that a polyester fabric (PTX9131 C75, available from Arque) was used as the target substrate instead of the cotton t-shirt.

Example 3

The transfer material (PET) was corona treated (700 kW). A liquid electrostatic printing apparatus (Indigo™ 6700 printing press from Hewlett-Packard™) was then used to electrostatically print the transparent release composition onto the transfer material (PET) to form a release layer (one separation) disposed on the transfer material and subsequently to electrostatically print the electrostatic ink composition (ElectroInk™ 4.5) on the release layer to provide an image layer disposed on the release layer.

The thermoplastic polyurethane film was then contacted with the image layer. A backing paper (a standard kitchen baking paper) was contacted with the thermoplastic polyurethane film. This construction was passed between two heated rollers, each roller at a temperature of 150° C., at a speed of 1 m/min and a pressure of 1 bar.

The backing paper was detached from the thermoplastic film. A cotton t-shirt (the target substrate) was then contacted with the thermoplastic film. This construction was passed between two heated rollers, each roller at a temperature of 150° C., at a speed of 1 m/min and a pressure of 1 bar. The transfer material (PET) was then separated from the cotton t-shirt (target substrate) such that the thermoplastic film, image layer and release layer were transferred to the cotton t-shirt.

Example 4

A heat transfer printed fabric was produced according to Example 3 except that a polyester fabric (PTX9131 C75, available from Arque) was used as the target substrate instead of the cotton t-shirt.

Reference Example 1

A heat transfer printed fabric (a cotton t-shirt) was produced by a method similar to that of Example 1 except that a water-based adhesive (MFP1890 available from Michelman) was used instead of the thermoplastic polyurethane film. The water-based adhesive was applied by using a draw-down technique (wire rod #4, available from Diversified Enterprises in Claremont, N.H. USA) and then dried in an oven for 5 min at 60° C. to provide a layer of water-based adhesive disposed on the image layer, the layer having a thickness of 1.5 µm.

Reference Example 2

A heat transfer printed fabric (a cotton t-shirt) was produced by the method according to Example 1 except that no thermoplastic polyurethane film was used.

Only partial transfer of the image to the fabric occurred. Portions of the image that were transferred to the fabric peeled off easily.

Peeling Test

Peeling tests were performed on the heat transfer printed fabrics produced in Examples 1 to 4.

An adhesive tape (3M Scotch tape 810) was applied to the heat transfer printed fabric. A heavy roller (2 kg) was rolled over the adhesive tape 4 times. The adhesive tape was then removed rapidly at 180° over 2 seconds.

Visual inspection of the Example 1 to 4 heat transfer printed fabrics showed no damage after the peeling tests.

Scratch Test

Scratch tests were performed on the heat transfer printed fabrics produced in Examples 1 to 4.

A Tungsten carbide nail (60 g load) was used to scratch the surface of the heat transfer printed fabrics.

Visual inspection of the Example 1 to 4 heat transfer printed fabrics showed no damage after the scratch tests.

Washing Tests

The washing resistance was tested by placing the Example 1 to 4 heat transfer printed fabrics in the washing machine. At least two cycles of washing for 2 h at 60° C. using Tyde washing powder as the detergent followed by a 3 h drying cycle in a tumble dryer at 40° C. were performed.

The images on Example 1 to 4 heat transfer printed fabrics remained after the washing and drying cycles.

A washing resistance test was performed by placing Reference Example 1 heat transfer printed fabric in the washing machine. One washing cycle (30° C., 2 h) removed all of the ink from the fabric.

The invention claimed is:

1. A process for heat transfer printing, the process comprising:
   electrostatically printing a transparent release composition onto a transfer material to form a release layer disposed on the transfer material;
   electrostatically printing an electrostatic ink composition on the release layer to form an image layer disposed on the release layer;
   contacting a thermoplastic film with the image layer, wherein the thermoplastic film has a thick of at least 50 µm or wherein the thermoplastic film comprises two or more layers of material;
   contacting the thermoplastic film with a target substrate under conditions such that the thermoplastic film adheres to the target substrate and the release layer is softened; and
   separating the target substrate and the transfer material such that the thermoplastic film, image layer and release layer are transferred to the target substrate.

2. The process according to claim 1, wherein the thermoplastic film has a thickness of at least 50 µm.

3. The process according to claim 1, wherein the thermoplastic film has the melting temperature of at least 50° C.

4. The process according to claim 1, wherein the thermoplastic film comprises a material selected from ethylene vinyl acetate (EVA), polyethylene, polystyrene, polypropylene, polybutene, polyester, poly(meth)acrylate, polyamides, thermoplastic polyimides, styrene block co-polymers, and thermoplastic polyurethanes.

5. The process according to claim 1, wherein the thermoplastic film comprises a thermoplastic polyurethane.

6. The process according to claim 5, wherein the thermoplastic polyurethane comprises a polymer formed from a polyisocyanate, a polyether polyol and a chain extender.

7. The process according to claim 1, wherein the thermoplastic film comprises the two or more layers of material.

8. The process according to claim 1, wherein contacting the thermoplastic film with the image layer constitutes laminating the thermoplastic film to the image layer.

9. The process according to claim 1, wherein contacting the thermoplastic film with the target substrate occurs at a temperature of 100° C. or above.

10. The process according to claim 1, wherein the target substrate is fabric.

11. A process for printing a heat transferable image, the process comprising:
    electrostatically printing a transparent release composition onto a transfer material to form a release layer disposed on the transfer material;
    electrostatically printing an electrostatic ink composition on the release layer to form an image layer disposed on the release layer; and
    laminating a thermoplastic film to the image layer, wherein the thermoplastic film has a thickness of at least 50 µm or wherein the thermoplastic film comprises two or more layers of material.

12. The process according to claim 11, wherein the thermoplastic film has the thickness of at least 50 µm.

13. The process according to claim 11, wherein the thermoplastic film comprises the two or more layers of material.

14. A heat transferable printed image comprising:
    a transfer material;
    an electrostatically printed transparent release layer disposed on the transfer material;
    an electrostatically printed image layer disposed on the release layer; and
    a thermoplastic film laminated to the image layer, wherein the thermoplastic film has a thickness of at least 50 µm or wherein the thermoplastic film comprises two or more layers of material.

15. The heat transferable printed image according to claim 14, wherein the thermoplastic film has the thickness of at least 50 µm.

16. The heat transferable printed image of claim 14, wherein the thermoplastic film comprises the two or more layers of material.

17. A process for heat transfer printing, the process comprising:
    electrostatically printing a transparent release composition onto a transfer material to form a release layer disposed on the transfer material;
    electrostatically printing an electrostatic ink composition on the release layer to form an image layer disposed on the release layer;
    contacting a thermoplastic film with the image layer;
    contacting the thermoplastic film with a fabric substrate under conditions such that the thermoplastic film adheres to the fabric substrate and the release layer is softened; and
    separating the fabric substrate and the transfer material such that the thermoplastic film, image layer and release layer are transferred to the fabric substrate.

18. The process according to claim 17, wherein the thermoplastic film comprises a material selected from ethylene vinyl acetate (EVA), polyethylene, polystyrene, polypropylene, polybutene, polyester, poly(meth)acrylate, polyamides, thermoplastic polyimides, styrene block co-polymers, and thermoplastic polyurethanes.

19. The process according to claim 17, wherein the thermoplastic polyurethane comprises a polymer formed from a polyisocyanate, a polyether polyol and a chain extender.

* * * * *